Figure 4:
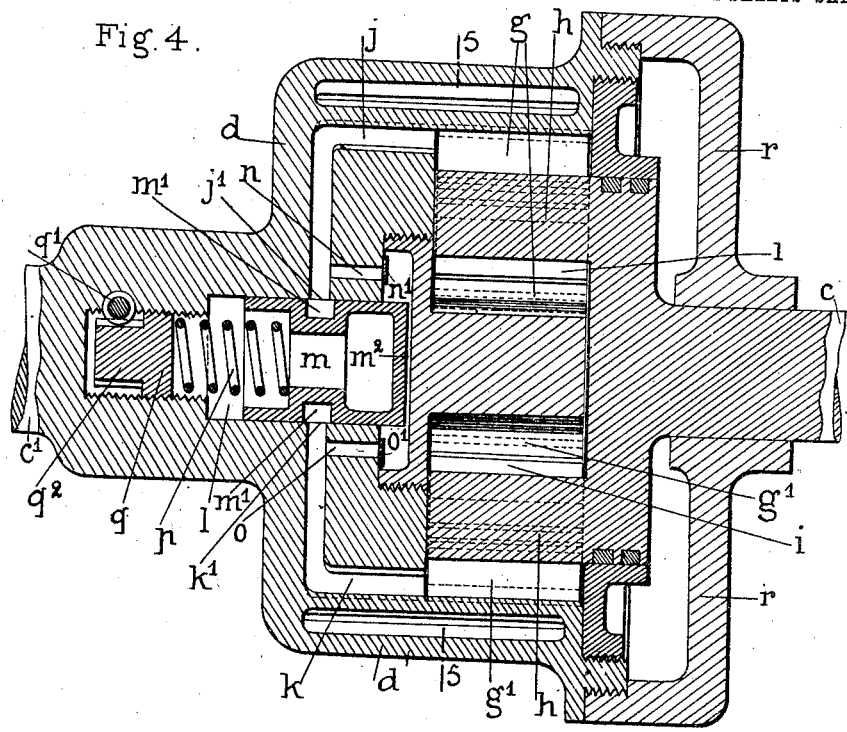

J. A. HARDY.
DIFFERENTIAL GEARING.
APPLICATION FILED FEB. 5, 1913.
1,093,573.
Patented Apr. 14, 1914.
2 SHEETS—SHEET 1.
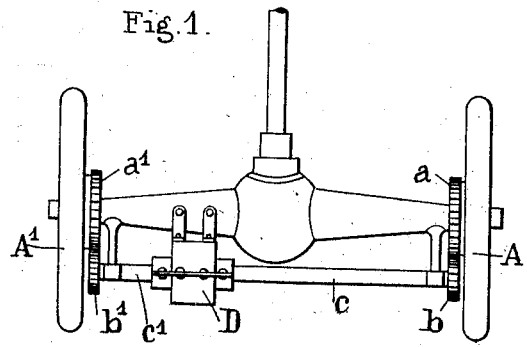
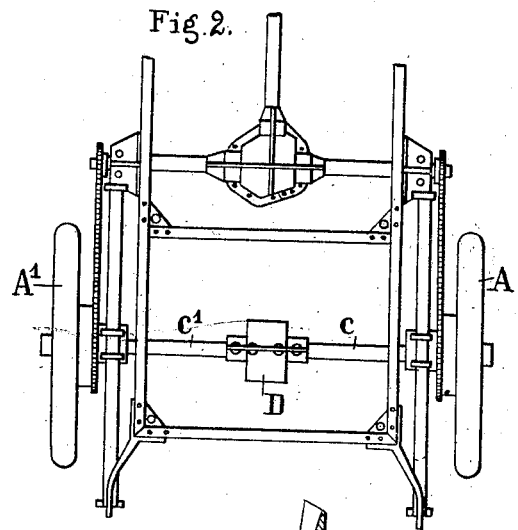
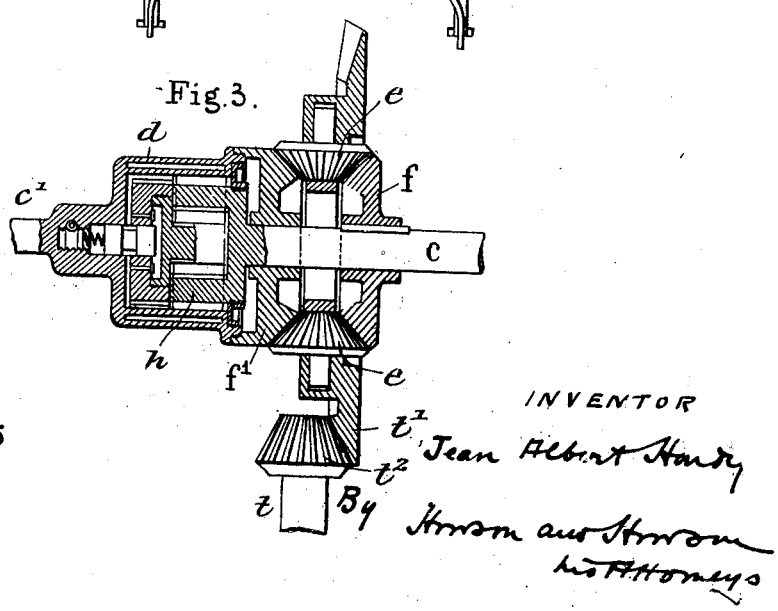
INVENTOR
Jean Albert Hardy
By Howson and Howson
his Attorneys
WITNESSES

J. A. HARDY.
DIFFERENTIAL GEARING.
APPLICATION FILED FEB. 5, 1913.

1,093,573.

Patented Apr. 14, 1914.
2 SHEETS—SHEET 2.

WITNESSES
L. H. Grote
M. E. Keis

INVENTOR
Jean Albert Hardy
By Howson and Howson
his Attorneys

UNITED STATES PATENT OFFICE.

JEAN ALBERT HARDY, OF PARIS, FRANCE.

DIFFERENTIAL GEARING.

1,093,572.

Specification of Letters Patent. Patented Apr. 14, 1914.

Application filed February 5, 1913. Serial No. 746,337.

*To all whom it may concern:*

Be it known that I, JEAN ALBERT HARDY, a citizen of the Republic of France, and a resident of 6 Avenue Jules Janin, Paris, France, have invented a new and useful Differential Gearing, of which the following is a specification.

It is well known that the differential or balance gear which has been applied to automobile vehicles to permit the driving wheels to assume one to the other a certain relative movement presents numerous disadvantages because of the relative mobility of the wheels. For instance when starting, it may happen that owing to the adhesion of one of the wheels being quite insufficient, departure of the vehicle is rendered impossible by the fact that this wheel is driven at double speed by the differential, the other wheel remaining stationary on the ground. Moreover, in the case of sudden brake-applying action on the differential and bad adhesion of one of the wheels, the latter may stop or even rotate in the wrong direction; the other wheel adhering properly to the ground will maintain the same speed and the rate of travel of the vehicle will be hardly slackened. Also, at high speed and under the influence of road shocks when one driving wheel momentarily leaves the ground it races away under the action of the differential and the driving effort on the other wheel is lessened; the result is considerable wear of the tires when the wheel regains contact with the ground and even a jerky progress. Various arrangements have already been tried, which are controlled by the driver and completely lock the differential. These arrangements enable the first of the above-mentioned inconveniences to be avoided, but since they completely suppress the action of the differential they are not suited to remedy the other inconveniences.

The present invention avoids these inconveniences and at the same time leaves the differential free to act in turning corners for instance.

The invention consists in arranging a brake, which works automatically, to limit the speed of relative movement of the driving wheels by locking them fast together as soon as the speed of this movement attains a predetermined limit, for instance twenty revolutions a minute. In this way I retain in the differential its freedom of action in turning corners and prevent the wheels from slipping under the conditions above considered.

The connection established by the special brake device can be effected either directly between the driving wheels or between the cage of the differential gear and one or other of the wheels, or again between the driving shaft and one or other of the wheels.

Figure 5:
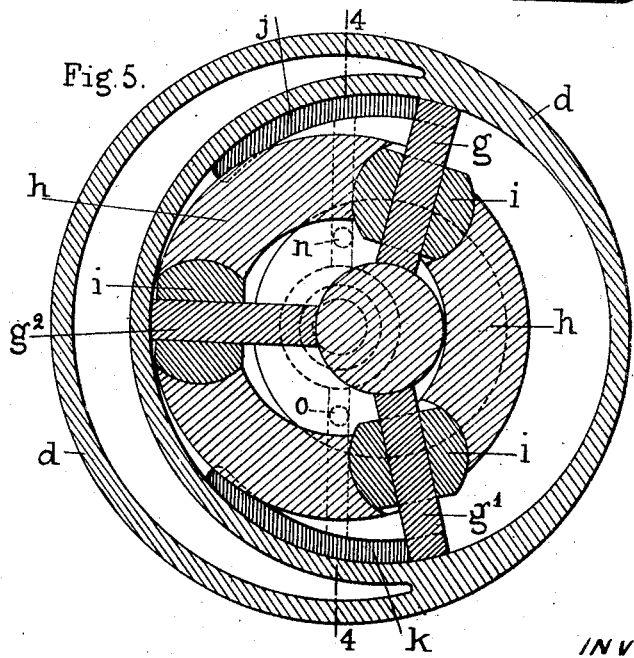

In the accompanying drawing:—Figure 1 is a plan of portion of a driving mechanism to which my invention is applied; Fig. 2 is a similar view showing my invention applied thereto in a modified arrangement; Fig. 3 is a section through a differential to which my invention is applied; and Figs. 4 and 5 are respectively longitudinal and cross sections through a braking device in which my invention is embodied.

Fig. 1 shows by way of example a diagram of the arrangement on a vehicle driven by a propeller shaft. Each driving wheel $A$ $A^1$ is provided with a toothed crown $a$ $a^1$ with which there engages a pinion $b$ $b^1$ keyed upon a shaft $c$ $c^1$; these shafts which have the same axis are connected together by the automatic brake device D. Bearings suitably arranged on the casing of the rear bridge support the shafts $c$ $c^1$. Since the braking device is constructed to act automatically as soon as the relative speed of the shafts $c$ and $c^1$ and consequently that of the wheels A and $A^1$ exceeds a certain limit, it will be understood that these shafts and therefore the wheels A and $A^1$ will become locked together as soon as this relative speed is passed.

Fig. 2 shows a second example of the mounting of the arrangement, in case the differential is mounted on an auxiliary shaft, as on a countershaft in the chain driven vehicle, for instance, I in this case connect the shafts $c$ $c^1$ which are fast to the driving wheels A and $A^1$, by the intermediary of the braking apparatus.

Fig. 3 represents in vertical section an arrangement in which the braking apparatus is combined with the differential itself. The pinions $e$, $e$ are the satellite pinions of the differential. The driving shaft $t$ drives the differential in customary manner through the bevel pinions $t^1$ and $t^2$. The gear plate $f$ of the differential is keyed to the shaft $c$ of one of the wheels and this shaft $c$ is solid with the part $h$ of the brake. The other gear plate $f^1$ of the differential is solid with the shaft $c^1$ of the other wheel, this shaft having an enlarged end $d$ which forms the casing of the brake. Obviously this arrangement operates in precisely the same manner as the constructions shown in Figs. 1 and 2. A method of carrying out this brake device is shown by way of example in Figs. 4 and 5, in which Fig. 4 is a longitudinal section on line 4—4 of Fig. 5, and Fig. 5 is a section on line 5—5 of Fig. 4. In this example, the brake arrangement is composed of a rotary oil pump, one of the parts of which is connected to one of the shafts $c$ $c^1$ and the other part to the other shaft; this oil pump delivers on itself, that is, in a closed cycle, and it is actuated in such a manner that when its speed of rotation tends to accelerate, the increasing pressure of oil acts upon a balanced piston; this piston effects the throttling of the outlet pipe for oil and because of the incompressibility of the oil, prevents the rotation of the pump. As the speed of the rotation of the pump corresponds with the speed of the relative movement of the shafts $c$ $c^1$ that is to say of the wheels A and $A^1$, it will be understood that I can thus limit the speed of this relative movement to such a figure as may have been fixed. The rotary oil-pump is provided with three vanes or blades $g$ $g^1$ $g^2$ driven by the shaft $c$ and turning in a pump-body or casing $d$ fast with the shaft $c^1$. The shaft $c$ carries at its extremity a cylindrical member $h$ which drives the blades by the intermediary of small split cylinders $i$ forming joints or packing and allowing each of them to remain during rotation in a plane passing through the axis of the cylindrical bore of the pump-body. The inlet and delivery pipes $j$ and $k$ of the pump connect at $j^1$ and $k^1$ with a cylindrical chamber $l$ hollowed out in the axis of rotation of the pump body and in which can travel a piston $m$ provided with a circular groove $m^1$. The position of the piston $m$ that is to say of the groove $m^1$ determines the size of the ports $j^1$ and $k^1$ which can be completely closed when the piston is pushed toward the left. At this moment the blades are stopped in the pump casing because of the incompressibility of the oil and the shafts $c$ $c^1$ turn fast together. To slide the piston $m$ the pressure of the oil is employed, this pressure increasing in the pump when the rotary speed is accelerated. For this purpose I have provided in the course of the pipes $j$ and $k$ passages $n$ $o$ provided with flap-valves $n^1$ $o^1$ which whatever be the direction of rotation allow the pressure of oil to act on the front face $m^2$ of the piston $m$. A spring $p$ tends to maintain the piston at the end of its stroke toward the right and consequently to insure the full opening of the ports $j^1$ and $k^1$. The tension of this spring can be regulated by the rotation of a screw-threaded plug $q$ controlled from the exterior for example, by means of a worm $q^1$ engaging a worm wheel $q^2$ at the end of the plug. A lid $r$ screwed on the body of the pump maintains in the apparatus a certain reserve of oil.

Obviously the construction shown may be variously modified to accomplish the same end in like or analogous situations and is to be regarded as merely an exemplary embodiment of my invention.

I claim as my invention:

1. In a device of the character described, a pair of rotors, a common driving rotor therefor and an operative connection between said rotors whereby the same may have varying speeds and fluid brake means operatively connected to two of said rotors and serving to automatically brake the rotor moving at a speed in excess of that of the coöperating rotor.

2. In a device of the character described, a pair of rotors, a common driving rotor therefor and an operative connection between said rotors whereby the same may have varying speeds and fluid brake means operatively connected to two of said rotors and serving to automatically lock said rotors against relative rotation after one of said rotors has reached a predetermined speed in excess of the coöperating rotor.

3. In a device of the character described, a pair of rotors, a common driving rotor therefor and an operative connection between said rotors whereby the same may have varying speeds and fluid brake means operatively connected to two of said rotors and comprising a casing with fluid circulating passages, fluid driving means, a throttle valve arranged in said fluid circulating passage, and means for subjecting said throttle valve to the variation in pressure on opposite sides of the fluid driving means, whereby the valve is actuated to control the circulatory passage, substantially as described.

In testimony whereof I have signed my name to this specification in the presence of two subscribing witnesses.

JEAN ALBERT HARDY.

Witnesses:
MAURICE PELLERIER,
LÉON PEILLEE.